(12) United States Patent
Ponting et al.

(10) Patent No.: US 6,786,139 B2
(45) Date of Patent: Sep. 7, 2004

(54) APPARATUS FOR DEEP FAT FRYING

(76) Inventors: Reams R. Ponting, Rte. 2, Box 133, Hale, MO (US) 64643; Ben Gibson, P.O. Box 452, Carrollton, MO (US) 64633

( * ) Notice: Subject to any disclaimer, the term of this patent is extended or adjusted under 35 U.S.C. 154(b) by 0 days.

(21) Appl. No.: 10/042,593

(22) Filed: Jan. 9, 2002

(65) Prior Publication Data

US 2003/0126994 A1 Jul. 10, 2003

(51) Int. Cl.[7] .................. A47J 27/00; A47J 27/026; A47J 37/00; A47J 37/12
(52) U.S. Cl. .................. 99/403; 99/330; 126/376.1; 126/391.1
(58) Field of Search .................. 99/330, 331, 430, 99/410, 417, 418; 126/376.1, 391.1, 390.1, 345; 165/185

(56) References Cited

U.S. PATENT DOCUMENTS

| | | |
|---|---|---|
| D25,927 S | 8/1896 | Bennett |
| 1,467,272 A | 9/1923 | Hazlehurst |
| 1,620,952 A | 3/1927 | Davies |
| D110,806 S | 2/1938 | Fishel |
| 2,393,420 A | 1/1946 | Scheuplein |
| 3,217,633 A | 11/1965 | Anetsberger |
| 3,512,472 A | 5/1970 | Berchtold et al. |
| 4,397,299 A | 8/1983 | Taylor et al. ............. 99/403 X |
| 4,442,969 A | 4/1984 | Holden |
| 4,831,224 A | 5/1989 | Keefer |
| 4,913,041 A | 4/1990 | Taber et al. .................. 99/403 |
| 5,184,539 A | 2/1993 | Oiwa ......................... 99/408 |
| 5,758,569 A | 6/1998 | Barbour |

OTHER PUBLICATIONS

Copy of Office Action of Abandoned App. S/N 09/520,528, Oct. 23, 2000.
Copy of Claims as filed from Abandoned App. S/N 09/520,528, Mar. 8, 2000.

Primary Examiner—Timothy F. Simone
(74) Attorney, Agent, or Firm—Hovey Williams LLP

(57) ABSTRACT

A deep fat fryer apparatus includes a cooking vessel and a support assembly which are complementally configured, whereby the cooking vessel fits into the support assembly's frame so that an elongated raised central portion of the cooking vessel is aligned above an elongated heating element of the support assembly. The cooking vessel includes sloping wall surfaces extending outwardly and downwardly from the central portion, preferably with one or a pair of troughs provided for collecting loose food particles deposited therein by convection currents in the cooking media. The troughs present a cooler zone for the collected particles than the cooking zone in the cooking medium above a grate on which food to be cooked is received.

19 Claims, 2 Drawing Sheets

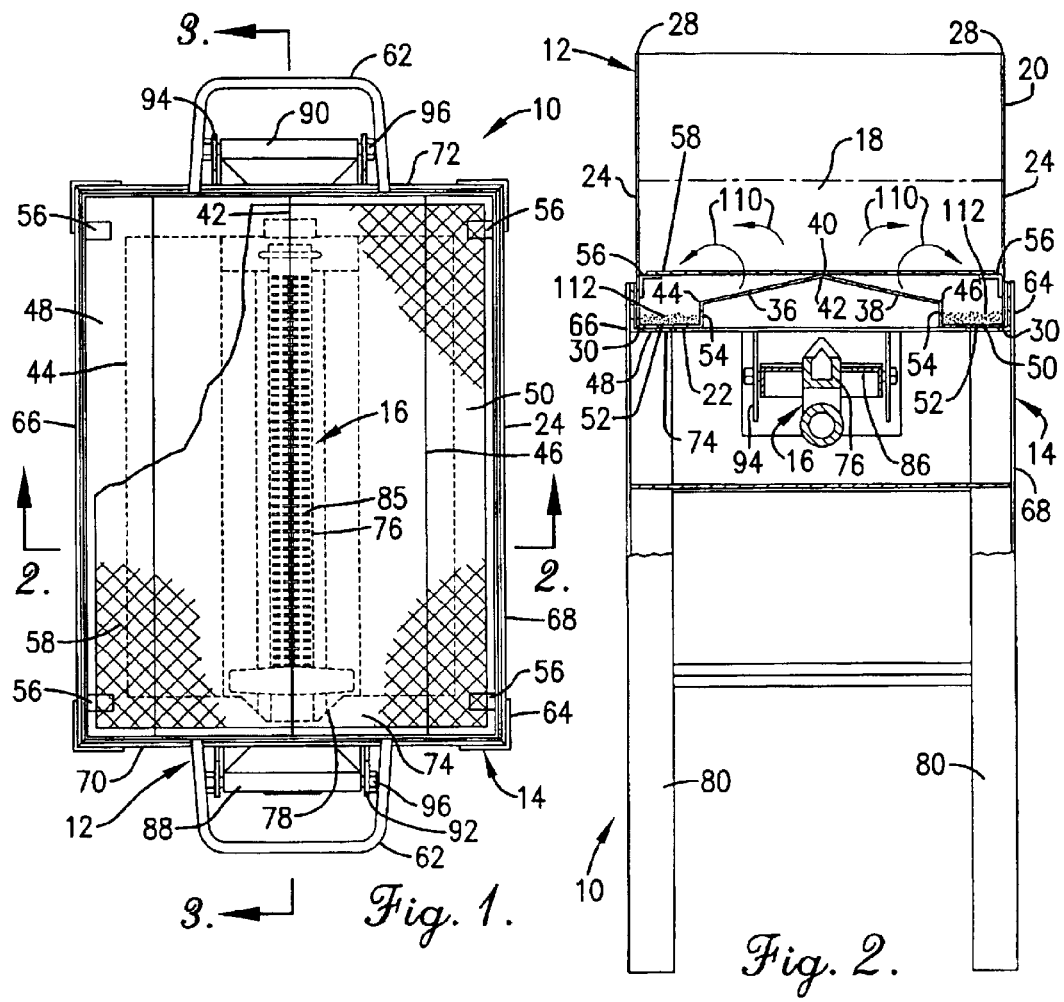
Fig. 1.
Fig. 2.
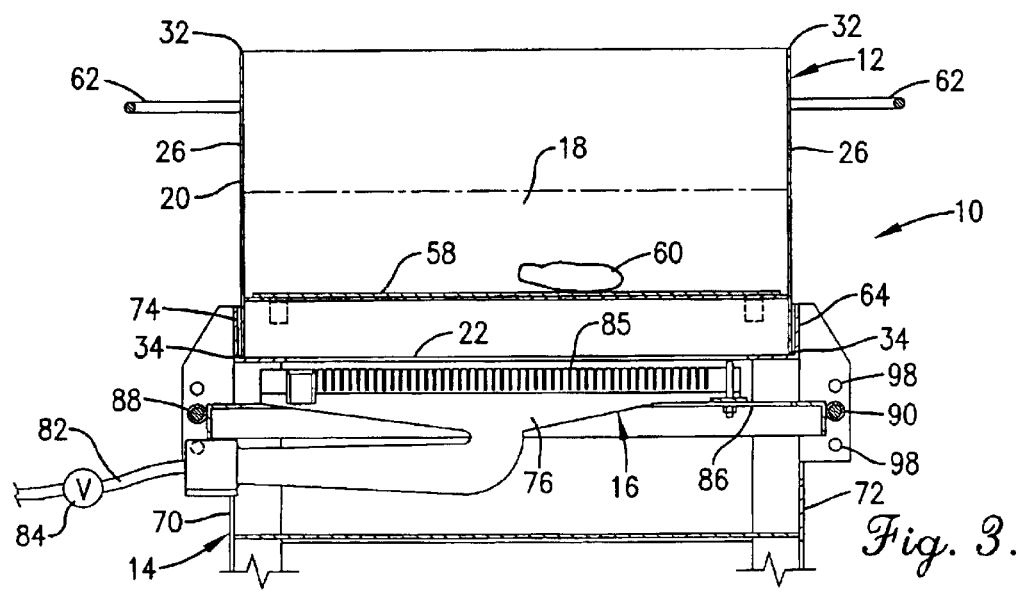
Fig. 3.

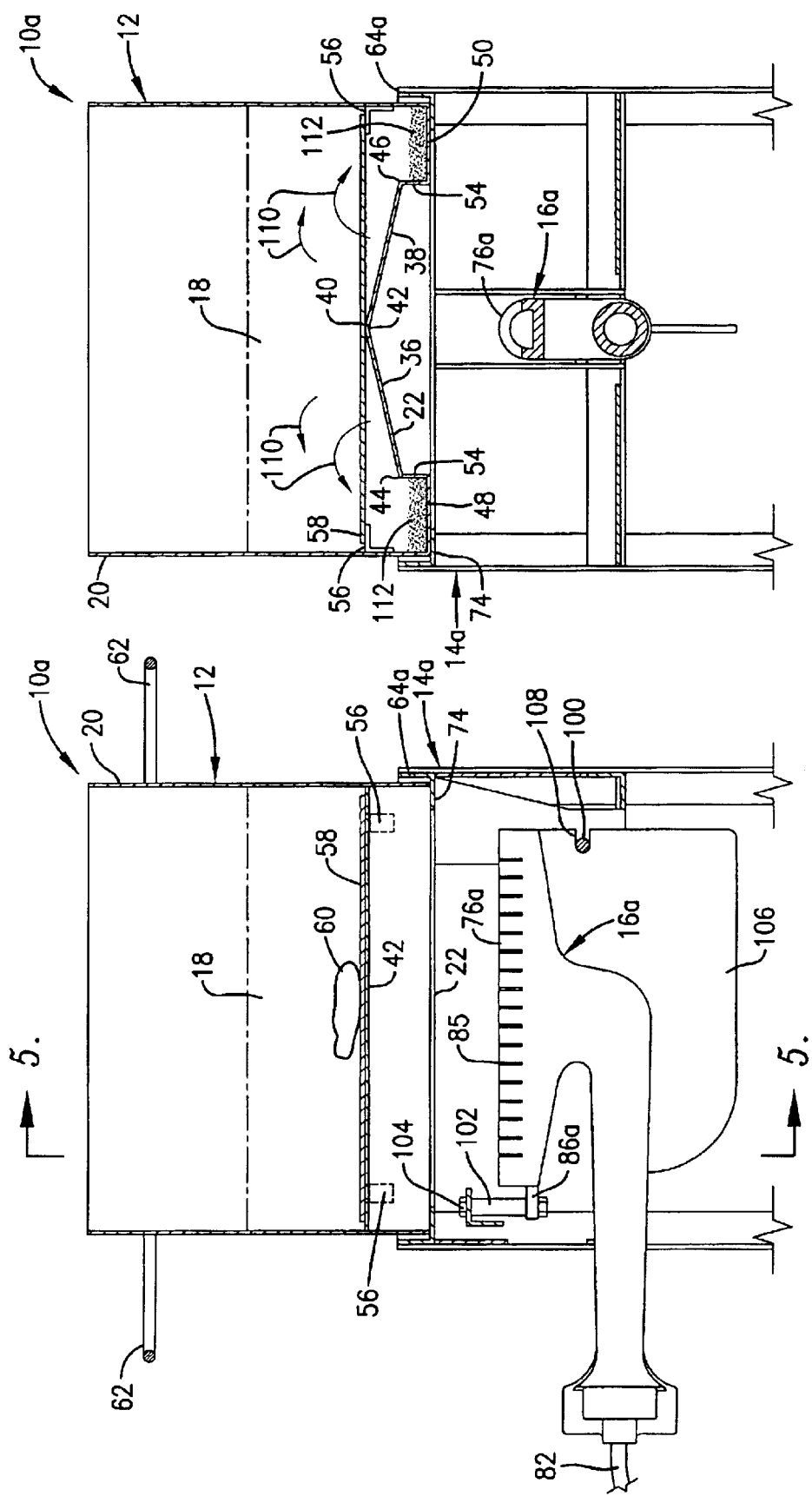

APPARATUS FOR DEEP FAT FRYING

BACKGROUND OF THE INVENTION

1. Field of the Invention

The present invention is broadly concerned with an apparatus for deep fat frying which includes a cooking vessel having a bottom wall with a central elevated portion and a support assembly complementally configured to the cooking vessel to hold the cooking vessel in a desired orientation and position a heating source so as to promote convection of the liquid cooking medium in the cooking vessel. When the heat source is activated, and more particularly below the central elevated portion, the heat source directs the heat generated thereby toward the bottom of the cooking vessel, convection currents are produced which result in more uniform heating of the liquid cooking medium and further aid in depositing loose food particles in troughs in the cooking vessel positioned laterally of the central elevated portion.

2. Description of the Prior Art

Deep fat fryers are generally known and used for frying many kinds of food in oil or fat. Typically, such devices consist of a cooking vessel (e.g., a pan, kettle, skillet or the like) which is filled with a cooking medium, such as oil, fat or shortening. The cooking vessel is placed over a heating element of an electric range or burner whereby, when the heating element is activated to heat the oil therein, food is deposited into the heated cooking medium for a desired period of time until the cooking process is completed and the food items are removed. Many types of food items such as poultry, fish, potatoes and the like may have various coatings, such as a flavored coating, breading or batter on the outside of the food item. Some portion of the coatings are inevitably separated from the food item during the cooking process and are either suspended in the heated cooking medium or drop to the bottom of the vessel. One type of deep fat frying apparatus which has enjoyed recent popularity for outdoor usage employs a large cylindrically shaped pan of a size sufficient to receive a turkey therein, the pan being positioned over a gas burner of a tripod pan support. The burner is positioned such that it is directly below the flat bottom of the cylindrically shaped pan, and thus the flames of the burner provide direct heating such that the bottom surface of the pan is the hottest region.

While such cooking devices provide for a relatively effective frying of the food, several problems exist with these conventional devices. First, the traditional positioning of the heating elements used to heat the cooking vessel do not provide an even temperature throughout the cooking medium. The temperature differential within the cooking medium attributable to direct heating of the bottom surface of the vessel is exacerbated when the cooking takes place in an outdoor environment, with cooler air surrounding the vessel sidewall. Specifically, a traditional flame burner or electric range heating element will provide most of the heat directly to the bottom wall of the cooking vessel and thus the highest temperature is found on the bottom wall and in the cooking medium immediately adjacent thereto. This concentration of heat at the flat bottom portion of the cooking vessel results in an uneven cooking temperature in that the cooking medium directly above and across the bottom portion of the cooking vessel heats to a higher temperature than the cooking medium in the upper depths of the vessel or along the sidewall(s). thus, food products placed in the cooking vessel may not cook evenly due to their position within the fryer. In the case of some items where the extent of cooking may not be readily detected, this may represent a danger to the user in that bacteria may not be completely eliminated within the food item.

Another problem associated with conventional frying apparatus is that elevated temperature at the bottom of the cooking vessel may result in fat breakdown with associated deterioration in flavor. This may also result in the inability to reuse the fat or oil for cooking subsequent batches of food items. A further disadvantage commonly associated with conventional deep fat frying apparatus is that when the cooking medium reaches an inappropriately high temperature, the cooking medium may catch on fire and cause a danger to the surroundings as well as the user. When the cooking medium is too hot and moisture is present, the moisture may flash and burn the user.

The separated coating particles on some food items will often drop onto the bottom surface of the cooking vessel which is often immediately above the heating element. As a result, these pieces of coating, skin, or other particles, referred to by those in the art as "cracklings," will burn or blacken and then may attach to the food items in the medium. This detracts from the taste and appearance of the food items. Further, if the temperature at the bottom of the vessel is too high, the cracklings may burn causing oxidation of the cooking medium, thereby reducing its useful life.

There has thus developed a need for an improved deep fat frying apparatus which maintains a more even heating of the cooking medium within the cooking vessel.

There is also a need for a deep fat frying apparatus which helps to prevent the deposit of cracklings over the hottest area of the pan.

There is a further need for a deep fat frying apparatus where the heat source is positioned relative to the cooking vessel to promote improved cooking without burning the food items or cracklings within the vessel.

SUMMARY OF THE INVENTION

These and other needs have largely been met by the deep fat frying apparatus of the present invention. That is to say, the deep fat frying apparatus hereof includes a uniquely configured cooking vessel in combination with a complementally configured heater support assembly which provides improved circulation of the cooking medium, provides a more efficient use of the heat source, provides for depositing cracklings in an area of the vessel remote from the heat source, and maintains a more even temperature of the cooking medium throughout the cooking region of the vessel. The deep fat frying apparatus hereof is configured to provide a pattern of convection currents which both avoids overheating of the cooking medium, provides more consistent temperatures, and separation and removal of cracklings from the cooking area.

Broadly speaking, the present invention includes a cooking vessel with a bottom wall having a longitudinally extending elevated central portion, sloping wall surfaces, and preferably at least one trough which is positioned along an upright sidewall, and a support assembly which includes a heating element and a frame support. The frame support is configured to hold the cooking vessel in a desired orientation whereby the heating element is aligned in registry with and positioned below the elevated central portion.

In preferred embodiments, the cooking vessel is provided with sidewalls and end walls which are of different lengths to facilitate orientation of the cooking vessel within the frame. Handles are coupled to the sidewalls or end walls to facilitate lifting of the cooking vessel. The sloping wall surfaces each have an outboard margin and an inboard margin which cooperatively define a ridge along the elevated central portion. The maximum horizontal width of each of the sloping wall surfaces being at least one fourth of the width of the endwalls. The downward sloping wall surfaces preferably have a slope relative to the horizontal between 4° and 30° and more preferably between about 10° and 20°. Preferably, a trough is provided adjacent each sidewall and have an upright, preferably vertical barrier wall which help to collect and hold the cracklings received therein. The central elevated region and sloped surfaces help to prevent burning and overheating of the cooking medium as well as more evenly receiving heat from the heating source by increasing the distance between the central elevated region directly above the heat source, providing surfaces which are oriented in facing relationship to the heat source, and by the end walls and barrier walls which help to hold the greatest concentration of heat generated by the heat source inboard of the troughs.

The sidewalls or endwalls preferably include a plurality of inwardly facing retaining ledges which are positioned to receive and hold a perforate grate onto which food to be cooked may initially descend and held at a desired depth within the cooking medium. The ledges are preferably positioned so that the grate is maintained substantially horizontal during cooking, and most preferably positioned so that the grate is also supported by the ridge of the elevated central portion. The sidewalls, end walls and bottom wall together form a housing, and may be constructed of any metal which provides good heat conductivity such as aluminum, copper, brass or stainless steel. Stainless steel, because of its resistance to corrosion and its cleaning properties, is the preferred material for the grate and the housing.

The support assembly has a frame which is sized and shaped to receive the cooking vessel in a desired orientation whereby the cooking vessel is held within the frame and supported thereon with its central elevated portion positioned directly above and aligned in registry with the heat source. Particularly preferred results are achieved when the heat source is provided as an elongated gas burner with a plurality of openings to direct flames upwardly. The heat source may be vertically adjustably carried by the frame to vary the distance between the heat source and the elevated central portion while maintaining alignment of the heat source beneath the elevated central portion, or the heat source may be fixedly mounted to the frame. It is generally desirable that the cooking medium within the vessel be heated to a temperature above 300° F. in order to provide satisfactory cooking to brown the food items without undue delay. The amount or intensity of heat supplied by the heat source may be varied by either adjustment of its position, as noted above, or by increasing the energy supplied to the heat source by a gas valve or rheostat in the case of an electric heating element.

The frame of the heater support assembly is constructed of iron or steel to be sufficiently rigid to provide a stable support for the cooking vessel when filled to a desired depth with the cooking medium. Preferably, the frame substantially surrounds the heat source and provides a central open area for the admission of air therein. A ledge is provided in the frame around the central open area for supporting the cooking vessel thereon. A plurality of legs elevate the frame above a supporting surface to position the frame and thus the cooking vessel at a convenient height while in use.

The deep fat fryer apparatus is used by filling the cooking vessel with a cooking fat such as lard or shortening or a cooking oil and then placing the vessel on the frame so that the elevated central portion is positioned in registry over the heat source. The heat source is activated, such as by opening a valve to admit gas and igniting the burner. The positioning of the heat source beneath the central elevated portion, the perforate grate, and the sloping wall surfaces allows the heated cooking medium to circulate by convection with the hottest part of the medium circulating upwardly from the elevated central portion. The convection currents then move outwardly toward the sidewalls, where they are cooled and move downwardly toward the troughs, then inwardly toward the elevated central portion, moving through the perforate grate. When a satisfactory cooking temperature for the cooking medium above the grate has been reached, preferably between about 300° F. and 400° F. and most preferably between about 345° F. to 350° F., a food item is deposited into the vessel and falls to the grate. The length of time the food item remains in the cooking vessel depends on the type of food item, the quantity, the depth of the medium, and its temperature. However, the convection currents continue during cooking, which have the effect of carrying the cracklings outwardly and depositing them in the troughs, where they are retained. The sloping wall surfaces also help to direct more dense cracklings to the troughs by gravity. Additionally and most beneficially, the temperature of the cooking medium in the troughs will be about 30° F. cooler than the temperature of the cooking medium in the cooking zone, i.e. above the grate. This not only promotes even cooking of the food items, but beneficially avoids overheating of the cooking medium in any one region and blackening or burning of the cracklings.

These and other advantages will be readily apparent to those skilled in the art with reference to the drawings and detailed description which follows.

BRIEF DESCRIPTION OF THE DRAWINGS

FIG. 1 is a top plan view of the deep fat fryer apparatus according to one embodiment of the present invention, showing a perforate grate resting upon retaining ledges and horizontal positioning of the elongated heat source relative to the central elevated portion and troughs in the cooking vessel;

FIG. 2 is a cross-sectional view of the deep fat fryer apparatus taken along line 2—2 of FIG. 1, showing the central elevated portion of the bottom wall of the cooking vessel and the troughs formed in the bottom wall and extending along the sidewalls;

FIG. 3 is a cross-sectional view of the deep fat fryer apparatus hereof taken along line 3—3 of FIG. 1, showing the preferred distance between the heat source and the bottom wall of the cooking vessel and the adjustable mounting of the heat source on the cooking assembly;

FIG. 4 is a cross-sectional view of a second embodiment of the deep fat fryer apparatus of the present invention wherein the heat source is fixed rather than adjustable and including an air baffle extending below the heat source; and FIG. 5 is a cross-sectional view taken along line 5—5 of FIG. 4 showing the heat source having an arcuate upper surface opposed to the bottom wall of the cooking vessel.

DESCRIPTION OF THE PREFERRED EMBODIMENTS

Referring now to the drawings, a deep fat fryer apparatus 10 in accordance with the present invention broadly includes a cooking vessel 12 and a support assembly 14 having an elongated heating element 16 providing a source of heat for elevating the temperature of a cooking medium 18 held within the vessel. The support assembly 14 is complementally configured to mate with and receive thereon the cooking vessel 12 whereby the support assembly removably receives the cooking vessel, resists lateral movement of the cooking vessel when placed thereon, and wherein the heating element 16 is positioned to promote optimal convection of the cooking medium within the cooking vessel. A typical cooking medium 18 for frying is vegetable oil, shortening, or lard, as is well known in the cooking arts.

In greater detail, a preferred cooking vessel 12 includes a housing 20 presenting a bottom wall 22, opposed upstanding sidewalls 24 and opposed upstanding end walls 26 positioned perpendicular to the sidewalls 24. The sidewalls 24 preferably have a length longer than the width of the end walls to present a longitudinal axis and to promote proper alignment of the cooking vessel 12 on the cooking support assembly 14. The sidewalls 24 and the end walls 26 are relatively deep, typically 10 inches or more, to provide for a sufficient depth of the cooking medium 18 received therein to completely cover the food placed therein, to prevent spillage over the top edge of the housing 20, and to promote the convection of the heated cooking medium as described herein. The sidewalls 24 have respective upper edges 28 and lower edges 30, and the end walls 26 similarly have respective upper edges 32 and lower edges 34, the upper edges 28 and 32 being substantially co-planar and the lower edges 34 also being substantially co-planar.

The bottom wall 22 has a pair of sloping wall surfaces 36 and 38 on either side of a longitudinally extending raised central portion 40 to present an inverted V-shaped ridge 42 of the bottom wall 22. The central portion 40 is preferably equidistant from each of the sidewalls 24 and extends longitudinally between the end walls. The sloping wall surfaces 36 and 38 have a similar, and more preferably the same slope to provide for uniform heat distribution throughout the cooking medium 18 by virtue of common reflectance, transmission therethrough, and convection. The sloping wall surfaces have a slope relative to the horizontal of between about 4° and 30°, and more preferably between 10° and 20°. The sloping wall surfaces 36 and 38 each have respective outboard edges 44 and 46, whereby the sloping wall surfaces 36 and 38 extend outwardly and downwardly from the raised central portion 40 to their respective outboard edges 44 and 46. The sloping wall surfaces 36 and 38 each have a maximum horizontal width which is preferably at least one fourth of the width of the end walls. Further, the outboard edges 44 and 46 are elevated relative to the lower edges 30 and 34. The bottom wall further includes troughs 48 and 50 extending parallel to but lower in elevation than the ridge 42, and are located between the outboard edges 44 and 46 and the respective sidewalls 24 adjacent thereto, and extend the length of the housing 20 between the end walls 26. The troughs 48 and 50 each have a preferably flat or slightly rounded bottom surface 52 and an upright inboard barrier wall 54 which is opposite the respective sidewalls 24 and which helps to inhibit the escape of particles of coating and the like received therein, and also helps to concentrate the heat generated by the heating element between the sidewalls 24, end walls 26, and the barrier walls 54. Most preferably, the barrier walls 54 are at least about ¾ inch high and the bottom surface 52 of the troughs are about 2 inches wide to facilitate holding of cracklings therein.

The housing 20 further includes a plurality of retaining ledges 56 which extend inwardly from the sidewalls 24 or the endwalls 26. The ledges 56 releasably receive thereon a grating 58 of mesh or wires which is supported on the ledges 56. Stainless steel is a preferable material for grating 58 for reasons of strength and ease of cleaning. Preferably, the ledges 56 are positioned above the bottom surface 52 of the troughs 48 and 50, and thus above the outboard edges 44 and 46, a sufficient distance to be at about the same vertical level as the elevated central portion 40, so that the grating 46 is supported by not only ledges 44 but also the ridge portion 42 of the central portion 40. This positioning of the grating 58 permits breading and the like to fall into the troughs 48 and 50 while permitting convection currents of the heated cooking medium 18 to circulate through the food items 60 placed on the grating 58, and promotes stability and prevents sagging of the grating as it is heated and food items are deposited into the cooking vessel 12. The housing 20 may further be provided with handles 62 attached to the exterior of the sidewalls 24 or endwalls 26 by mechanical fasteners such as rivets, welding or other suitable means. Because the handles 62 are below the upper edges of the sidewalls and end walls, a cover or screen may be placed on the housing 20 to inhibit spillage or splashing of the cooking medium, or to limit heat loss through the open top of the cooking vessel 12.

The support assembly 14 is provided with heating element 16 and further includes a support frame 64 for receiving and positioning the cooking vessel 12 over the heating element 16 so that the elevated central portion 40 is aligned with and positioned in spaced relationship above the heating element 16. The support frame 64 may be constructed by welding of mild steel or other suitably rigid, substantially fire resistant materials as is well known in the art. This complemental relationship between the support assembly 14 and the cooking vessel 12 provides a number of benefits, including economization of heat, positive positioning of the heat source relative to the cooking vessel, and impedes the unintentional movement of the cooking vessel 12, as well as providing proper separation between the heating element 16 and the bottom wall 22 of the cooking vessel 12. Support frame 64 preferably includes upright side panels 66 and 68 and end panels 70 and 72. The side panels 66 and 68 and end panels 70 and 72 present an area therewithin sized to receive the housing 20 of the cooking vessel 12 therein. Frame 48 further includes a support flange 74 which extends inwardly from the panels in substantially circumscribing, inwardly extending relationship. The support flange 74 not only serves to support the cooking vessel 12 thereon, but acts as a heat shield along the troughs 48 and 50 to further maintain a relatively cooler region of the cooking medium 18 therein. The support flange 74 provides a central open area whereby the bottom of the sloping wall surfaces are directly exposed to the heat generated by the heating element, and further admits air to help in combustion of the gas when the heating element 16 is a flame burner 76. The flange 74 may be provided by angle irons welded to the inside of the panels. A notch 78 may be provided at one or both portions of the flange 74 adjacent the end walls 26 to provide for air admission in the vicinity of the heat source and to permit heat from the heating element 16 to be directed toward the ridge in the proximity of one or both end walls 26. The support assembly 14 further includes a plurality of support legs 80 which elevate the support frame 64 to a height to make access to the cooking vessel 12 placed thereon convenient.

The heating element 16 may be an electrically powered element but more preferably is a flame burner 76 which is connected to a source of combustible fuel such as propane, butane, or the like, either a fixed supply or a portable container as is well known in the art, by a supply conduit 82. The flow of fuel to the burner 76 may be controlled by a valve of a conventional type, either at the source where the conduit 82 is connected, or by a valve 84 between the flame burner 76 and the supply conduit 82. The flame burner 76 is typically of cast iron or other durable material for long life, and is elongated, having a plurality of openings 85 such as transverse slits along its longitudinal length, as shown in FIGS. 1 and 3 to provide an even supply of flame along most of the length of the central portion 40. FIG. 2 shows that the flame burner 76 has an angled upper surface with each side thereof oriented toward a respective one of the sloping wall surfaces 36, 38. As shown in FIGS. 1, 2 and 3, the flame burner 76 may include a carrier 86 having receivers 88 and 90 at respective ends thereof. The support frame 64 may be provided with adjustment mounts 92 and 94, and the receivers 88 and 90 are configured to receive bolts 96 or other fasteners. The adjustment mounts 92 and 94 each include a plurality of holes 98 positioned in vertically spaced relationship, whereby the bolts 96 may pass through the holes 98 and the receivers 88 and 90 and couple the carrier 86 at the desired height relative to the support frame 64. Thus, the proximity of the flames generated by the flame burner 76 to the central raised portion 40 of the bottom wall may be adjusted according to the desired amount of heat or other environmental conditions, but most preferably the top of the flame burner 76 is positioned no closer than about 2 inches from the bottom wall of the cooking vessel 12 to provide even heat distribution and to avoid scorching. In most cooking applications, the position of the flame burner 76 will be below the plane of the flange 74, which provides sufficient proximity to the bottom wall to provide good heat transfer and also promotes sufficient air circulation while avoiding scorching of the bottom wall. It may be appreciated from FIG. 2 that the sloping wall surfaces are oriented to present their bottom surfaces generally toward the flame burner 76 whereby heat generated by the flame burner 76 will be readily received by radiation, convection and contact with the flames generated thereby.

A modified deep fat fryer assembly 10a including an alternate embodiment of the support assembly 14a is illustrated in FIGS. 4 and 5, wherein the flame burner 76a has an arcuate upper surface and is at a fixed position relative to the support frame 64a. The arcuate upper surface of flame burner 76a provided with transverse slots longitudinally spaced along the flame burner 76a serves to disperse the heat to avoid scorching on the central raised portion 40 or the sloping wall surfaces due to an excessive concentration of heat in any area. As with flame burner 76, the top of the flame burner 76a is preferably positioned below a plane defined by the bottom edge of the end walls and side walls. The support frame 64a is provided with crossbolt 100 which extends through baffle 106 and the carrier 86a includes an upright sleeve 102 which receives a bolt 104 therein for coupling the flame burner 76a to the support frame 64a. Moreover, the carrier 86a includes a downwardly extending baffle 106 which not only includes a notch 108 for receipt of the crossbolt 98 but also helps to inhibit strong gusts of wind from impairing the performance of the flame burner 76a. In other respects, the cooking vessel 12 and other aspects of the support assembly 14a as shown in FIGS. 4 and 5 are substantially as shown and described with regard to the embodiment shown in FIGS. 1, 2, and 3.

In use, after the height of the flame burner 76 is adjusted, supply conduit 82 is connected to a source of fuel and the valve opened, the gas emitted from the flame burner 76 is ignited. Thereafter, the cooking vessel 12 filled with cooking medium 18 is placed on the support frame 64. The depth of the cooking medium 18 may vary depending on the size of the vessel and the character and amount of food items to be cooked, but generally sufficient cooking medium 18 should be provided so that when liquified, the depth of the cooking medium 18 extends at least about 2½ to 3 inches above the grate. Because of the complemental configuration between the support frame 64 and the cooking vessel 12, the latter is only capable of receipt within the support frame 64 when in a proper orientation with the elevated central portion 40 positioned immediately above and in registry with the heating element 16. Because the heating element 16 is spaced from the elevated central portion 40, it is less likely to overheat the cooking medium immediately above the bottom wall 22. More importantly, as the cooking medium 18 begins to heat, the heat from the heating element 16 is directed toward the sloping wall surfaces 36 and 38, while the cooking medium received in the troughs remains cooler. This results in convection currents 110 being developed within the cooking medium which provide a rolling action to circulate the cooking medium upwardly from the sloping wall surfaces 36 and 38 and the elevated central portion 40 and then outwardly toward the sidewalls 24. The convection currents 110 then move downwardly along the sidewalls 24 and toward the troughs. Because the troughs are horizontally displaced outboard of the heating element 16, the cooking medium 18 over the troughs is cooler and less prone to scorching. This cooler cooking medium 18 then circulates toward the elevated central portion 40 as the convection cycle continues.

Once the cooking medium 18 reaches a desired temperature, for example between 300° F. and 400° F., and more preferably between about 345° F. and 350° F., food items 60 placed into the cooking vessel 12 will begin being cooked. Most food items 60 will initially sink onto the grate, where the convection currents convey the heated cooking medium 18 through the grate and around the food item. Because of the longitudinal orientation of the central ridge 42 and the sloping wall surfaces in combination with the heating element aligned therewith, the convection currents 110 share a common rolling pattern as described above all along the length of the vessel 12. It is common for small particles, known as cracklings 112, to become separated from the food item 60 during the cooking process. The cooking vessel 12 having the elevated central portion 40 over the flame burner 76, causes the convection currents 110 to carry the cracklings outwardly and deposit them in the troughs where they resist blackening and burning because of the cooler temperatures in that region. For example, because of the positioning of the heating element 16 relative to the elevated central portion 40 and the fact that the flange serves to somewhat shield the trough, the temperature of the cooking medium 18 over the trough and between the barrier wall and the sidewall 24 will typically be about 30° F. cooler than the temperature of the cooking medium 18 immediately above the raised central portion 40. Moreover, dense cracklings not carried by the convection currents 110 will fall onto the sloped wall surfaces and then into the troughs by virtue of gravity. The substantially vertical barrier walls inhibit the convection currents from carrying the cracklings 112 deposited therein.

Thus, the deep fat fryer apparatus as shown and described herein presents substantial improvements in food quality and cooking effectiveness.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention. For example, two or more heating elements could be utilized provided they extend longitudinally and the combined heating elements are generally longitudinally centered and aligned below the elevated central portion.

The inventors hereby state their intent to rely on the Doctrine of Equivalents to determine and assess the reasonably fair scope of their invention as pertains to any apparatus not materially departing from but outside the literal scope of the invention as set out in the following claims.

What is claimed is:

1. Apparatus for deep fat frying of food items comprising:
   a cooking vessel including first and second opposed upright end walls each having respective upper and lower edges, first and second opposed upright sidewalk each having respective upper and lower edges, and a bottom wall extending between the end walls and the side walls to provide a vessel adapted for retaining a quantity of a cooking medium therein, said bottom wall including first and second sloping wall surfaces diverging and downwardly extending from an elongated central raised portion, said central raised portion longitudinally extending between said end walls; and
   a heater support assembly including a frame and an elongated heating element, said frame being complementally configured to said cooking vessel for resisting horizontal movement of the cooking vessel relative to the frame and for removably supporting said cooking vessel above said heating element with the central raised portion being in spaced relationship directly above and in vertical alignment with said elongated heating element,
   wherein said frame includes an upright retaining member adjacent said cooking vessel side walls and end walls when said cooking vessel is received in said frame, and wherein said cooking vessel side walls and end walls are complementally sized and configured relative to said frame whereby said frame receives said cooking vessel inside said retaining member only with said central raised portion positioned in vertical alignment with said elongated heating element.

2. Deep fat frying apparatus as set forth in claim 1, wherein said upright retaining member of said frame is a lip substantially circumscribing said cooking vessel side walls and end walls when the cooking vessel is received in the frame.

3. Deep fat frying apparatus as set forth in claim 2, wherein said bottom wall of said cooking vessel includes at least one trough which is vertically lower than said sloping wall surfaces, is elongated and substantially parallel to said central raised portion, and is positioned between an outboard edge of one of said sloping wall surfaces and one of said side walls so as to be outboard of said heating element when said cooking vessel is received in said frame.

4. Deep fat frying apparatus as set forth in claim 3, wherein said bottom wall of said cooking vessel includes an upright barrier wall extending upwardly from said trough and downwardly from said outboard edge of said one of said sloping wall surfaces.

5. Deep fat frying apparatus as set forth in claim 4, wherein said bottom wall of said cooking vessel includes a second trough extending parallel to said one trough and along an other of said side walls so as to be outboard of said heating element when said cooking vessel is received in said frame.

6. Deep fat frying apparatus as set forth in claim 1, wherein said heating element is an elongated gas burner.

7. Deep fat frying apparatus as set forth in claim 1, wherein said central raised portion is an elongated ridge extending between said end walls and is located substantially equidistant from said side walls.

8. Deep fat frying apparatus as set forth in claim 1, wherein said sloping wall surfaces have a slope relative to the horizontal of between about 4° and about 30°.

9. Deep fat frying apparatus as set forth in claim 8, wherein said sloping wall surfaces have a slope relative to the horizontal of between about 10° and 20°.

10. Deep fat frying apparatus as set forth in claim 1, wherein said side walls are substantially perpendicular to said end walls and wherein said side walls have a length and said end walls have a width, the length of said side walls being greater than the width of said end walls.

11. Deep fat frying apparatus as set forth in claim 10, wherein sloping wall surfaces have lowermost outboard edges and the lower edges of the side walls and end walls extend below the lowermost outboard edges of the sloping wall surfaces.

12. Deep fat frying apparatus as set forth in claim 1, wherein said cooking vessel includes a perforate grate positioned in an elevated position relative to the outboard edge of the sloping wall surfaces to define a cooking zone thereabove.

13. Apparatus for deep fat frying of food items comprising:
   a cooking vessel including first and second opposed upright end walls each having respective upper and lower edges, first and second opposed upright sidewalls each having respective upper and lower edges, and a bottom wall extending between the end walls and the side walls to provide a vessel adapted for retaining a quantity of a cooking medium therein, said bottom wall including first and second sloping wall surfaces diverging and downwardly extending from an elongated central raised portion, said central raised portion longitudinally extending between said end walls; and
   a heater support assembly including a frame and an elongated heating element, said frame being complementally configured to said cooking vessel for resisting horizontal movement of the cooking vessel relative to the frame and for removably supporting said cooking vessel above said heating element with the central raised portion being in spaced relationship directly above and in vertical alignment with said elongated heating element,
   wherein said heating element is adjustably mounted to said frame for positioning in one of a plurality different locations at different vertical spacing relative to the central raised portion of the cooking vessel when the cooking vessel is received on the frame.

14. Apparatus for deep fat frying of food items comprising:
   a cooking vessel including first and second opposed upright end walls each having respective upper and lower edges, first and second opposed upright sidewalls each having respective upper and lower edges, and a bottom wall extending between the end walls and the side walls to provide a vessel adapted for retaining a quantity of a cooking medium therein, said bottom wall including first and second sloping wall surfaces diverging and downwardly extending from an elongated central raised portion, said central raised portion longitudinally extending between said end walls; and a heater support assembly including a frame and an elongated heating element, said frame being complementally configured to said cooking vessel for resisting horizontal movement of the cooking vessel relative to the frame and for removably supporting said cooking vessel above said heating element with the central raised portion being in spaced relationship directly above and in vertical alignment with said elongated heating element, wherein said cooking vessel includes a perforate grate positioned in an elevated position relative to the outboard edge of the sloping wall surfaces to define a cooking zone thereabove.

15. Deep fat frying apparatus as set forth in claim 14, wherein said cooking vessel includes inwardly projecting support ledges for retaining said grate thereon.

16. Deep fat frying apparatus as set forth in claim 15, wherein said support ledges are mounted on said side walls at a height above said outboard edge of the sloping wall surfaces whereby said grate rests on said central raised portion.

17. Deep fat frying apparatus as set forth in claim 14, wherein said heating element is adjustably mounted to said frame for positioning in one of a plurality of different locations at different vertical spacing relative to the central raised portion of the cooking vessel when the cooking vessel is received on the frame.

18. A cooking vessel adapted for deep fat frying after positioning over a heating element and for receiving a quantity of a cooking medium and at least one food item therein, said cooking vessel comprising:

a pair of upright opposed end walls each having a respective upper edge and a respective lower edge;

a pair of upright opposed side walls oriented substantially perpendicular to the end walls, each of the side walls having a respective upper edge and a respective lower edge; and a bottom wall extending between the end walls and the side walls to provide a vessel adapted to contain a cooking medium therein, said bottom wall including first and second sloping wall surfaces each having a respective outboard edge and an elongated central raised portion extending between said end walls, said first and second sloping wall surfaces extending outwardly and downwardly from said central raised portion toward respective side walls, wherein said bottom wall includes a pair of longitudinally extending troughs oriented substantially parallel to said central raised portion and extending below said outboard edges of said sloping wall surfaces, said troughs each including an upright barrier wall opposite and inboard of said side walls and extending downwardly from said outboard edges of respective ones of said sloping wall surfaces; and a plurality of retaining ledges coupled to at least one of said side walls or end walls, and a perforate grate supported on said retaining ledges and said central raised portion.

19. A cooking vessel as set forth in claim 18, wherein said lower edges of said side walls and end walls extend below said outboard edges of said sloping wall surfaces.

* * * * *